United States Patent [19]
Fergason et al.

[11] 3,963,324
[45] June 15, 1976

[54] LIQUID CRYSTAL DISPLAY ASSEMBLY

[75] Inventors: James L. Fergason, Kent; Duane E. Werth, Stow, both of Ohio

[73] Assignee: Hoffmann-La Roche Inc., Nutley, N.J.

[22] Filed: Sept. 10, 1973

[21] Appl. No.: 395,571

Related U.S. Application Data

[63] Continuation-in-part of Ser. No. 250,890, May 8, 1972, abandoned.

[52] U.S. Cl. ............................... 350/160 LC; 428/1
[51] Int. Cl.² ............................................ G02F 1/13
[58] Field of Search ................... 350/160 LC; 428/1

[56] References Cited
UNITED STATES PATENTS

| | | | |
|---|---|---|---|
| 3,700,306 | 10/1972 | Cartmell et al. | 350/150 |
| 3,731,987 | 5/1973 | Fergason | 350/150 |

OTHER PUBLICATIONS

Haller et al., "Aligning Nematic Liquid Crystals", IBM Technical Disclosure Bulletin, vol. 13, p. 3237, Apr. 1971.

*Primary Examiner*—Edward S. Bauer
*Attorney, Agent, or Firm*—Samuel L. Welt; George M. Gould; Mark L. Hopkins

[57] ABSTRACT

An improved assembly for a liquid crystal display of the polarized light shutter type is obtained by applying to the facing surfaces of transparent parallel plates, between which a layer of liquid crystal material is disposed, a material selected from the group consisting of water soluble polymers and polyvinyl acetal resins which facilitate unidirectional rubbing of the facing surfaces of the plates to produce a twisted nematic structure.

3 Claims, 2 Drawing Figures

U.S. Patent June 15, 1976 3,963,324
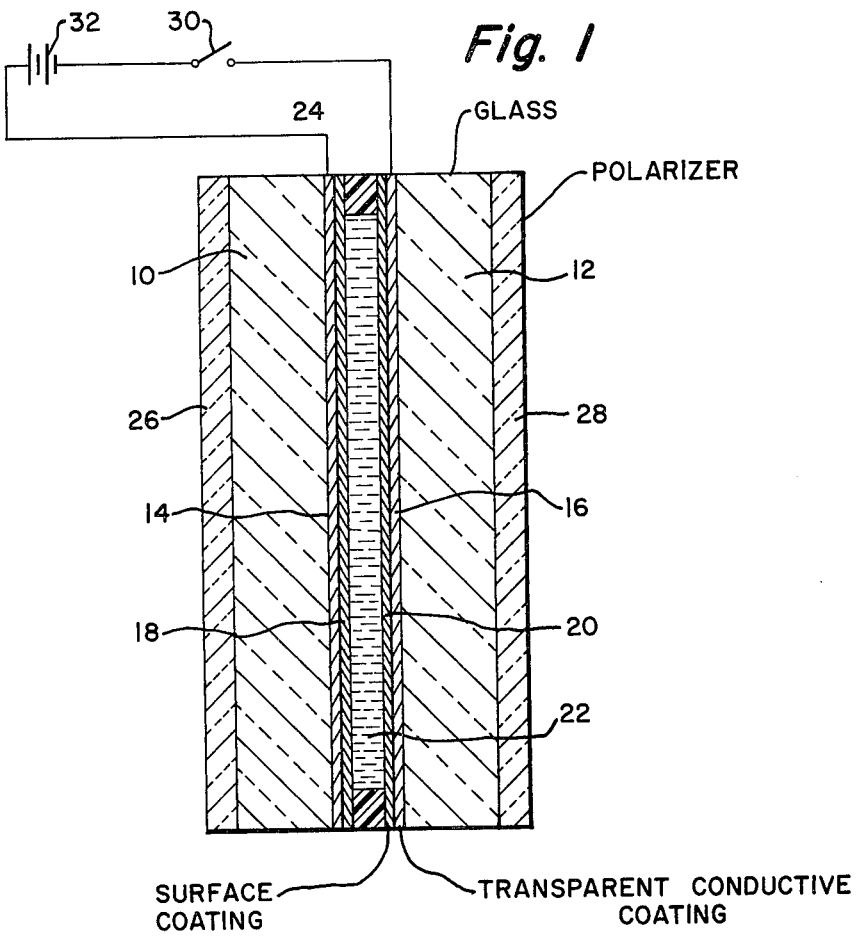
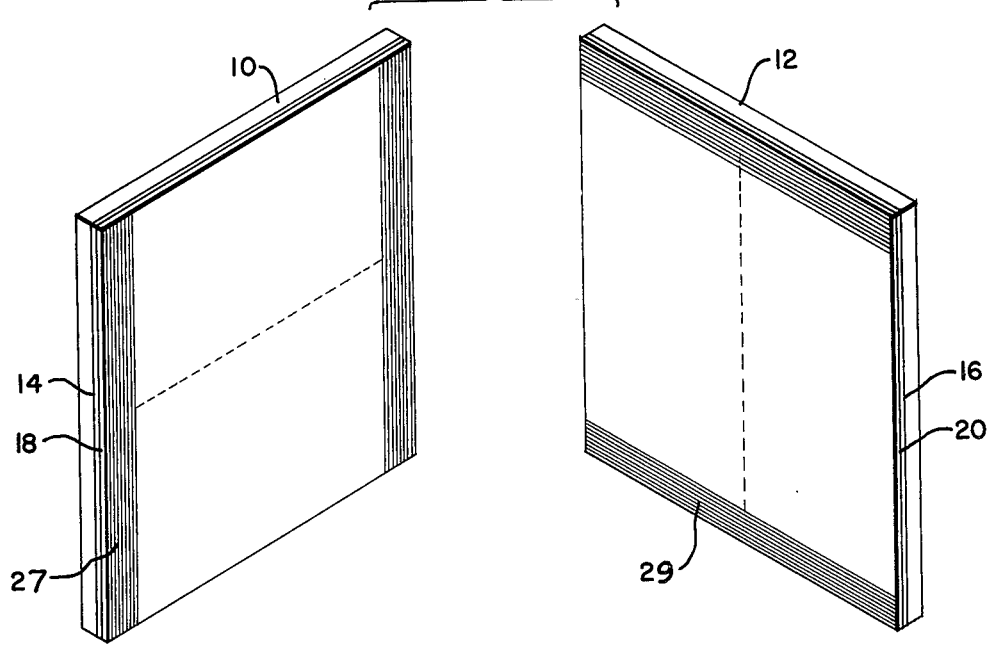

LIQUID CRYSTAL DISPLAY ASSEMBLY

CROSS-REFERENCES TO RELATED APPLICATIONS

This application is a continuation-in-part of copending application Ser. No. 250,890, filed May 8, 1972, and now abandoned.

BACKGROUND OF THE INVENTION

While not necessarily limited thereto, the present invention is particularly adapted for use in the production of liquid crystal displays of the type shown in copending application Ser. No. 136,441, filed Apr. 22, 1971 and assigned to the Assignee of the present application, now U.S. Pat. No. 3,371,986, issued May 8, 1973. Optical display devices of the type shown in the aforesaid patent convert electrical intelligence into optical images with the use of a shutter device comprising a layer of liquid crystal material sandwiched between opposing parallel plates coated with transparent conducting films. These plates, with the liquid crystal material therebetween, are disposed between and parallel to a pair of polarizers such that when an electrical potential is established across the conducting films and the liquid crystal layer, the device will change from a light transmitting to opaque medium, or vice versa, depending upon the orientation of the two polarizers. By forming the two conducting films in the shape of a desired optical image, that image can be made to appear or disappear, depending upon whether a potential is established between the conducting films. Furthermore, by creating separate conducting areas, as by etching the conducting films, any number of conductive regions can be switched ON while other regions are not affected to produce any one of a number of different images with the same liquid crystal sandwich assembly.

In constructing a liquid crystal display of the type described above, it is necessary to unidirectionally rub the facing surfaces of the transparent parallel plates between which the layer of liquid crystal material is disposed. By orienting the directions of rubbing on the respective plates transverse to each other, a twisted nematic structure is achieved; and assuming that the directions of rubbing are at right angles to each other, the liquid crystal material will rotate the plane of polarization of polarized light by 90°. When such a device with a 90° twist is placed between parallel polarizers, no light will be transmitted at zero voltage and it will be the equivalent of two crossed polarizers. When an electric field is applied to the transparent conducting films on the respective plates, however, the structure will untwist at a well-defined voltage and allow light transmission. If, however, the same device is placed between crossed polarizers, then at zero voltage light is transmitted and the polarizers will effectively act as though they are parallel. However, with the application of a critical voltage, the plane of polarization will no longer be rotated 90° and no light will be transmitted.

SUMMARY OF THE INVENTION

In accordance with the present invention, a new and improved liquid crystal display assembly of the type described above is provided wherein a correct twisted nematic structure is insured by applying a water soluble polymer or a polyvinyl acetal resin to the facing surfaces of the transparent parallel plates prior to unidirectional rubbing. This gives a better contrast between the light and dark areas of the liquid crystal display; and while no precise explanation can be given for this phenomenon, it is believed that the water soluble polymer or resin facilitates the creation of well-defined rubbed lines which, as mentioned above, induce the necessary twisted nematic structure.

The above and other objects and features of the invention will become apparent from the following detailed description taken in connection with the accompanying drawings which form a part of this specification, and in which:

FIG. 1 is a schematic view, in section and not to scale, of a liquid crystal unit constructed in accordance with the teachings of the invention; and FIG. 2 is a view illustrating the mode of preparation of the coatings of the invention on transparent parallel plates, between which a layer of liquid crystal material is disposed in the assembly of FIG. 1.

With reference now to the drawings, and particularly to FIG. 1, the liquid crystal cell shown is of the polarized light shutter type described in U.S. Pat. No. 3,371,986, issued on May 8, 1973. It comprises a pair of spaced flat pieces of glass or other similar transparent material 10 and 12. Provided on the facing surfaces of the transparent plates 10 and 12 are coatings 14 and 16 of transparent conductive material, such as tin oxide or indium oxide. Overlying the transparent conductive coatings 14 and 16 are coatings 18 and 20 of the surface treating material of the invention; and between the coatings 18 and 20 is a layer 22 of liquid crystal material. As is more fully described in the aforesaid U.S. Pat. No. 3,731,986, the liquid crystal material 22 is nematic at room temperature and is of positive dielectric anisotropy. Surrounding the layer of liquid crystal material is a suitable gasket 24 which may comprise a thermosetting resin. On the outer surfaces of the transparent plates 10 and 12 are crossed polarizers or polarizing films 26 and 28. It should be understood, however, that the polarizers 26 and 28 can be on the inner facing surfaces of the transparent plates and may, for instance, comprise polarizing dichoric films.

In FIG. 2, there is a view of the transparent plates 10 and 12 with the surface coatings 18 and 20 of the present invention thereon. The lines 27 on the coating 18 indicate a direction of rubbing. The lines 29 on the coating 20 have the same significance. In the preparation of the liquid crystal unit, the coatings 18 and 20 that are in contact with the layer of nematic-phase liquid crystal material 22 are prepared by being stroked or rubbed unidirectionally with, for example, a cotton cloth. Furthermore, the lines or direction of rubbing on coating 18 are at right angles to those on coating 20. It is known that the molecules in a nematic-phase liquid crystal material are each long and straight, and they tend to lie parallel, like straws in a broom. A property of the nematic-phase material is that the molecules in the vicinity of a rubbed surface tend to align themselves with it. The molecules nearest the layer 18 are thus inclined to orient themselves parallel with the lines 27; and those nearest the layer 20 are inclined to orient themselves parallel to the lines 29. The structure or orientation of the molecules in-between the rubbed lines 27 and 29 is then twisted, the axes of the molecules being parallel to lines 27 adjacent plate 10 and those intermediate gradually assuming angular positions approaching the direction of rubbing on surface 20 until the molecules adjacent the plate 12 are at right angles to those adjacent plate 10. This gives rise to the twisted structure described above with no electrical potential applied between the conducting films 14 and 16.

The effect of the liquid crystal unit on polarized light directed through the plates 10 and 12 and polarized parallel to the lines 29, for example, is that the unit effects a rotation of the plane of polarization of the light as it passes therethrough, so that the light emanating from the surface of the plate 10 is plane polarized parallel to the lines 27. However, it would not matter if the plane polarized light impinging on the plate 12, for example, were polarized in parallel planes that were at some angle with respect to the lines 29. The same effect of rotation of the plane of polarization is obtained. The extent of rotation does not need to be 90°. Any desired extent of rotation may be obtained, merely by properly orienting the unidirectionally rubbed layers 18 and 20. However, when the directions of rubbing are at right angles to each other, the extent of rotation is 90°.

Thus, assuming that the polarizers 26 and 28 are at right angles to each other and that the directions of rubbing are at right angles, polarized light passing through polarizer 28, for example, will be twisted or rotated through 90° in passing through the liquid crystal layer 22 and will then pass through the polarizer 26.

Now, if an electrical potential is applied between the conducting films 14 and 16 as by closing switch 30 connected to the opposite terminals of a battery 32, the liquid crystal molecules will untwist and the unit will no longer rotate the plane of polarization through 90°. This, therefore, blocks the transmission of the light through the unit which acts as a light shutter. By applying the conductive films 14 and 16 to only selected areas on the two transparent plates 10 and 12, certain areas of the unit can be made to transmit light while others will not and will appear opaque, thereby forming an optical image. Thus, by selectively coating the two transparent plates 10 and 12 with the transparent conductive material, an alpha-numeric display can be constructed as taught in U.S. Pat. No. 3,731,986.

It will be appreciated, of course, that instead of using crossed polarizers it is also possible to use parallel polarizers, in which case no light will pass through the cell in the absence of an electrical potential applied between the transparent conducting films but will pass through when an electrical potential is applied to untwist the nematic structure.

Originally, it was thought that suitable rubbed lines could be provided on the transparent conducting films 14 and 16 on the plates 10 and 12 by simply rubbing them without any surface preparation. While a surface preparation is perhaps not absolutely essential, it has been found that better contrast between the light and dark areas of the liquid crystal display can be achieved by applying a suitable polymer or resin 18 and 20 to the facing surfaces. The layers 18 and 20, without limitation, preferably comprise a water soluble polymer or a polyvinyl acetal resin. Among suitable materials which can be used are polyvinyl alcohol, polyethylene oxide and polyvinyl pyrrolidone, all of which are water soluble polymers. Alternatively, polyvinyl butyral, polyvinyl formal, polyvinyl glyoxal or polyvinyl glutaral can be employed, all of which are polyvinyl acetal resins. Such resins are sold, for example, by Monsanto Polymers & Petrochemicals Company of St. Louis, Mo. under various trademarks including BUTVAR and FOMVAR.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a liquid crystal display, the combination of a pair of transparent parallel plates, areas of transparent conductive material on the facing surfaces of said transparent parallel plates, a layer of a water soluble organic polymer selected from the group consisting of polyvinyl alcohol, polyethylene oxide, and polyvinyl pyrrolidone deposited over said transparent conductive material which will facilitate the production of well-defined lines produced upon rubbing, the transparent conductive areas with said material thereon being rubbed unidirectionally, a layer of liquid crystal material between said transparent conductive areas whereby a twisted nematic structure will be produced in the liquid crystal material by virtue of said unidirectional rubbing, polarizers on the sides of said transparent plates opposite said liquid crystal material, and means for establishing an electrical field between said transparent conductive areas.

2. In a liquid crystal display, the combination of a pair of transparent parallel plates, areas of transparent conductive material on the facing surfaces of said transparent parallel plates, a layer of material deposited over said transparent conductive material comprising a polyvinyl acetal resin which will facilitate the production of well-defined lines produced upon rubbing, the transparent conductive areas with said material thereon being rubbed unidirectionally, a layer of liquid crystal material between said transparent conductive areas whereby a twisted nematic structure will be produced in the liquid crystal material by virtue of said unidirectional rubbing, polarizers on the sides of said transparent plates opposite said liquid crystal material, and means for establishing an electrical field between said transparent conductive areas.

3. The liquid crystal display of claim 2 wherein said resin is selected from the group consisting of polyvinyl butyral, polyvinyl formal, polyvinyl glyoxal and polyvinyl glutaral.

* * * * *